United States Patent [19]

Nishimura et al.

[11] Patent Number: 4,828,906
[45] Date of Patent: May 9, 1989

[54] RESIN COMPOSITION AND FILM SUITABLE FOR AGRICULTURAL COVERING MATERIAL

[75] Inventors: Toshihiro Nishimura, Futtsu; Takashi Matsunaga, Ichihara, both of Japan

[73] Assignee: Mitsui Petrochemical Industries, Ltd., Tokyo, Japan

[21] Appl. No.: 93,206

[22] Filed: Sep. 4, 1987

[30] Foreign Application Priority Data

Sep. 5, 1986 [JP] Japan .................. 61-208004

[51] Int. Cl.$^4$ .................. C08J 5/18; C08L 23/16; C08L 23/18
[52] U.S. Cl. ...................... 428/220; 525/240
[58] Field of Search .......... 525/240; 428/220

[56] References Cited

U.S. PATENT DOCUMENTS

| | | | |
|---|---|---|---|
| 4,429,079 | 1/1984 | Shibata et al. | 428/35 |
| 4,438,238 | 3/1984 | Fukushima et al. | 428/220 |
| 4,590,124 | 5/1986 | Schoenberg | 428/354 |

FOREIGN PATENT DOCUMENTS

| | | |
|---|---|---|
| 52-039741 | 3/1977 | Japan . |
| 57-059943 | 4/1982 | Japan . |
| 58-038738 | 3/1983 | Japan . |
| 58-222131A | 12/1983 | Japan . |
| 59-022945A | 2/1984 | Japan . |

*Primary Examiner*—Carman J. Seccuro
*Attorney, Agent, or Firm*—Sherman and Shalloway

[57] ABSTRACT

A film suitable for an agricultural covering material is formed from a resin composition comprising a blend comprising (A) an ethylene/α-olefin random copolymer having a low melt flow rate and (B) an ethylene/α-olefin copolymer having a high melt flow rate. The random copolymer (A) has a density ($D_A$) of 0.935 to 0.950 g/cc and the random copolymer (B) has a density ($D_B$) of 0.905 to 0.935 g/cc, and the density ($D_B$) of the random copolymer (B) satisfies the requirement of $D_B \leq 0.9 D_A + 0.09$ in which $D_A$ stands for the density of the copolymer (A).

4 Claims, 1 Drawing Sheet

RESIN COMPOSITION AND FILM SUITABLE FOR AGRICULTURAL COVERING MATERIAL

BACKGROUND OF THE INVENTION (1) Field of the Invention

The present invention relates to an agricultural covering material generally called "mulch film".

(2) Description of the Prior Art

In the mulch cultivation, a mulch film is used for elevating the ground temperature, retaining water in soil, preventing caking of soil, preventing effluence of nutrients and preventing growth of weeds.

A mulch film composed of high-pressure method low-density polyethylene or a blend of high-pressure method low-density polyethylene and an ethylene/α-olefin random copolymer rubber is known (see Japanese Patent Application Laid-Open Specification No. 116735/81).

However, the mechanical strength of the mulch film composed of high-pressure method low-density polyethylene is low and therefore, the thickness should be increased beyond 20 μm. For example, when a film is formed at a blow ratio exceeding 2 and the thickness is adjusted to less than 20 μm, the tear strength is low and the film is readily broken or torn when the film is spread or dismantled. On the other hand, if the film thickness is larger than 20 μm, the Young's modulus is increased and the film becomes stiff, and the film fails to adhere tightly to the solid surface of a levee and an air layer is readily formed between the film and soil. Accordingly, growth of weeds is promoted and cultivation plants are damaged by fluttering of the film by a wind or rain.

Furthermore, this mulch film is insufficient in the heat resistance, and if the film is a so-called perforated mulch film holes are expanded while the film is used and the capacity of the film as the covering material is reduced.

Moreover, the mulch film composed of a blend of high-pressure low-density polyethylene and an ethylene/α-olefin copolymer rubber is insufficient in the weatherability and long-run formability and is not satisfactory in the strength, transparency and surface characteristics such as the gloss.

SUMMARY OF THE INVENTION

We made research with a view to solving the foregoing problems involved in the conventional mulch film and developing a starting resin composition capable of being formed into an excellent mulch film, and as the result, we have not completed the present invention.

More specifically, in accordance with the present invention, there is provided a resin composition suitable for an agricultural covering material, which comprises a blend comprising (A) a resin of a random copolymer of ethylene with an α-olefin having at least 3 carbon atoms, which has a melt flow rate of 0.01 to 0.1 g/10 min (as determined at 190° C.) and a density ($D_A$) of 0.935 to 0.950 g/cc as determined at 20° C. and (B) a resin of a random copolymer of ethylene with an α-olefin having at least 4 carbon atoms, which has a melt flow rate of 0.1 to 5 g/10 min (as determined at 190° C.), at an (A)/(B) weight ratio of from 95/5 to 50/50, wherein the density ($D_B$)(g/cc) of the random copolymer resin as the component (B), determined at 20° C., satisfies the following requirements:

$0.905 \leq D_B \leq 0.935$, and $D_B \leq 0.9 D_A + 0.09$ wherein $D_A$ stands for the density of the random copolymer resin as the component (A), determined at 20° C.

In the resin composition of the present invention for a mulch film, the random copolymer (A) has a low melt flow rate (MFR) and a high density ($D_A$), and therefore, the random copolymer (A) gives high tensile strength and rigidity to the resulting film.

The random copolymer (B) to be used in combination with the random copolymer (A) has a high melt flow rate (MFR) and a low density ($D_B$), and therefore, the random copolymer (B) gives a flexibility to the resulting film and improves the tear strength and impact resistance of the film.

Especially, according to the present invention, since the density ($D_B$) of the random copolymer (B) is in the range satisfying the requirement of $D_B \leq 0.9 D_A + 0.09$, as is apparent from examples given hereinafter, the tear strength and impact resistance of the film can be improved without reduction of the inherent characteristics of the random copolymer (A).

DETAILED DESCRIPTION OF THE PREFERRED EMBODIMENTS

Figure 1:
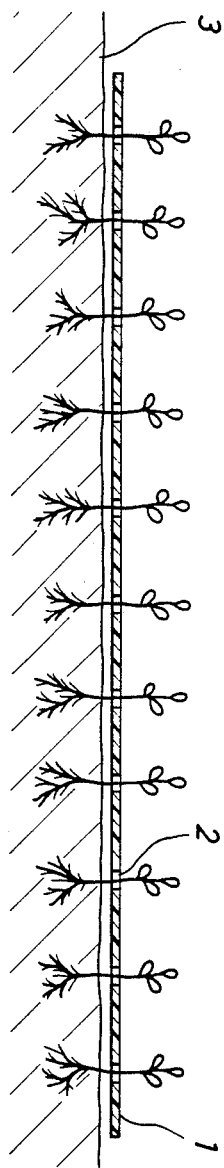
FIG. 1 is a diagram showing an example of the mulch film.

An example of the mulch film is illustrated in FIG. 1. Many holes 2 are formed in this mulch film 1, and the mulch film 1 is spread on the ground 3. If seeds are sown on the ground 3 through the holes 2, plants grow through the holes 2. If this mulch film 1 is used, growth of weeds or effluence of nutrients can be prevented.

CONSTITUENT RESINS (1) Component (A)

In the present invention, a random copolymer of ethylene with an α-olefin having a low flow rate is used as the resin component (A).

This random copolymer resin has a crystallinity of at least 50% as determined by the X-ray diffractometry and is distinguishable over a so-called amorphous rubber.

An α-olefin having at least 3 carbon atoms is copolymerized with ethylene. As specific examples, there can be mentioned propylene, 1-butene, 1-pentene, 3-methyl-1-butene, 1-hexene, 3-methyl-1-pentene, 4-methyl-1-pentene, 1-heptene, 1-octene and 1-decene.

The ethylene content in the random copolymer is at least 95% mole%.

In the present invention, the random copolymer resin has a melt flow rate (190° C.) of 0.01 to 0.1 g/10 min, especially 0.02 to 0.08 g/10 min, and the density ($D_A$, 20° C.) is 0.935 to 0.950 g/cc.

If the melt flow rate (MFR) is lower than 0.01 g/10 min, the film-forming property is degraded. If the melt flow rate (MFR) is higher than 1.0 g/10 min, the drawing orientation becomes impossible and a film in which the strength is well-balanced in the longitudinal and lateral directions cannot be obtained.

If the density is within the above-mentioned range, an appropriate rigidity can be imparted to the resulting film.

(2) Component (B)

An ethylene/α-olefin random copolymer resin having a high melt flow rate (MFR) (having a crystallinity of at least 40% as determined by the X-ray diffractometry) is used as the component (B).

An α-olefin having at least 4 carbon atoms is used as the α-olefin to be copolymerized with ethylene. Any of the α-olefins exemplified above with respect to the component (A) can be used, so far as it has at least 4 carbon atoms. The ethylene content in the random copolymer resin (B) is at least 90 mole%.

This random copolymer resin is known as so-called linear low-density polyethylene, and the melt flow rate (MFR) (190° C.) of this resin is 0.1 to 5 g/10 min, especially 0.8 to 3 g/10 min.

If the melt flow ratio (MFR) is lower than 0.1 g/10 min, the resin composition is insufficient in the extrudability in an extruder, and if the melt flow rate is higher than 5 g/10 min, the dispersibility of both the resins in each other is degraded and the appearance characteristics are degraded.

In view of the film-forming property and heat resistance, it is preferred that the melting point of the ethylene/α-olefin random copolymer, measured by a diffierential scanning type calorimeter, be in the range of from 115 to 130° C.

In the present invention it is important that the density ($D_B$) of the random copolymer (B) at 20° C. should be in the range of from 0.905 to 0.935 g/cc and should satisfy the requirement of $D_B \leq 0.9 D_A + 0.09$ in which $D_A$ stands for the density of the random copolymer (A) at 20° C.

Namely, if the density is in the range of from 0.905 to 0.935 g/cc, the random copolymer resin has excellent characteristics such as high tear strength and impact resistance, and high flexibility, tear strength and impact resistance can be imparted to the resulting film without degradation of the characteristics of the random copolymer resin (A), such as high tensile strength and rigidity of the film.

PREPARATION OF COMPOSITION

According to the present invention, by blending the random copolymer components (A) and (B) at an (A)/(B) weight ratio of from 95/5 to 50/50, especially from 92/8 to 70/30, a resin composition suitable for forming a film excellent in such characteristics as tear strength, rigidity, flexibility, tear strength and impact resistance is obtained.

For example, if the amount of the random copolymer resin having a high melt flow rate exceeds the above-mentioned range, drawing at a blow ratio of at least 2 becomes difficult and a film in which the strength is well-balanced in the longitudinal and lateral directions cannot be obtained. If the amount of the random copolymer resin having a high melt flow rate is too small and below the above-mentioned range, it is difficult to improve the flexibility, tear strength and impact resistance.

Blending of the resins can be accomplished according to known methods such as the dry blending method using a Henschel mixer or a tumbling mixer and the melt blending method using an extruder or the like.

At the blending step, known additives such as an antioxidant, an ultraviolet absorbent, a lubricant, a slip agent, an antiblocking agent, a flow modifier, an antistatic agent and a colorant may be added according to known recipes, so far as the characteristics of the resin composition of the present invention are not degraded.

PREPARATION OF FILM

The resin composition of the present invention can be formed into a film excellent in the above-mentioned characteristics according to the so-called inflation method.

According to the inflation method, a film is prepared by extruding a melt of the resin composition through a slit die and expanding the extrudate at a blow ratio of at least 2 by a predetermined air stream.

At this operation, the resin temperature is preferably adjusted to 190 to 250° C.

The obtained film has a thickness of 5 to 20 μm, especially 7 to 15 μm.

The so-obtained film is prominently superior to conventional films formed from high-density polyethylene and the like in tensile characteristics, tear characteristics, impact strength, flexibility and weatherability.

For example, by dint of improved impact strength and tear strength, damage of the film can be effectively prevented when the film is actually used.

As is apparent from the foregoing description, according to the present invention, a film having a good adhesion to soil and being excellent in such characteristics as weatherability, tensile characteristics and tear strength can be obtained.

This film can be effectively used as a mulch film, for which manifestation of the effect of elevating the ground temperature and other effects is required, for outdoor cultivation, tunnel cultivation, house semi-forcing cultivation, processing post-free cultivation and early cropping cultivation.

The present invention will now be described in detail with reference to the following examples that by no means limit the scope of the invention.

EXAMPLE 1

An ethylene/1-butene random copolymer (the ethylene content was 98.4 mole%) having a melt flow rate (MFR) of 0.04 g/10 min and a density ($D_A$) of 0.945 g/cm$^3$ was used as the random copolymer resin component (A).

An ethylene/4-methylpentene-1 random copolymer (the ethylene content was 95.7 mole%) having a melt flow rate (MFR) of 2.0 g/10 min and a density ($D_B$) of 0.920 g/cm$^3$ was used as the random copolymer resin component (B).

These random copolymer resins were blended at an (A)/(B) weight ratio of 90/10, and the blend was formed into a film having a thickness of 10 μm at a forming temperature of 200° C. and a blow ratio of 4 by using an air-cooling inflation film-forming machine equipped with an extruder having a die diameter of 50 mm.

The physical properties of the obtained film are shown in Table 1.

EXAMPLE 2

A film having a thickness of 10 μm was prepared in the same manner as described in Example 1 except that an ethylene/4-methylpentene-1 random copolymer (the ethylene content was 97.6 mole%) having a melt flow rate (MFR) of 2.1 g/10 min and a density ($D_B$) of 9.30 g/cm$^3$ was used as the random copolymer resin component (B).

The physical properties of the obtained film are shown in Table 1.

EXAMPLE 3

A film having a thickness of 10 μm was prepared in the same manner as described in Example 1 except that an ethylene/1-butene random copolymer (the ethylene content was 98.6 mole%) having a melt flow rate (MFR) of 0.03 g/10 min and a density ($D_A$) of 0.949 g/cm$^3$ was used as the random copolymer resin component (A) and the component (A)/component (B) weight ratio was changed to 80/20.

The physical properties of the obtained film are shown in Table 1.

COMPARATIVE EXAMPLE 1

A film having a thickness of 10 μm was prepared in the same manner as described in Example 1 except that an ethylene/1-butene random copolymer (the ethylene content was 99 mole%) having a melt flow rate (MFR) of 0.04 g/10 min and a density ($D_A$) of 0.953 g/cm$^3$ was used as the random copolymer resin component (A) and any component (B) was not used at all.

The physical properties of the obtained film are shown in Table 1.

COMPARATIVE EXAMPLE 2

A film having a thickness of 10 μm was prepared in the same manner as described in Example 1 except that the random copolymer resin (A) used in Example 3 was used as the random copolymer resin component (A) and an ethylene/propylene copolymer rubber (the ethylene content was 80% by weight) was used as the component (B).

The physical properties of the obtained film are shown in Table 1.

TABLE 2

|  |  | Example 4 |
|---|---|---|
| Randam Copolymer (A) | | |
| MFR | (g/10 min) | 0.08 |
| D | (g/cm$^3$) | 0.940 |
| Randam Copolymer (B) | | |
| MFR | (g/10 min) | 1.0 |
| D | (g/cm$^3$) | 0.910 |
| (A)/(B) Blend Weight Ratio | | 90/10 |
| Physical Properties of Film | | |
| Tear Strength | MD | 10 |
| (kg/cm) | TD | 95 |
| Impact Strength (kg · cm/cm) | | 9000 |
| Tensile characteristics, MD/TD | | |
| stress at yield (kg/cm$^2$) | | —/230 |
| strength at break (kg/cm$^2$) | | 780/710 |
| elongation at break (%) | | 195/560 |
| Young's modulus × 10$^3$ (kg/cm$^2$) | | 7.9/8.3 |
| Weatherability | | |
| Residual ratio (%) of tensile strength in MD direction after 30 days | | 97 |
| Elongation residual ratio (%) after 60 days | | 60 |

We claim:

1. A film for an agricultural covering material, which has a thickness of 5 to 20 μm and is obtained by subjecting a starting resin composition to the inflation film-forming operation at a blow ratio of at least 2, said resin composition comprising a blend comprising (A) a resin of a random copolymer of ethylene with an α-olefin having at least 3 carbon atoms, which has a melt flow rate of 0.02 to 0.08 g/10 min 190° C.), a crystallinity of at least 50% by the X-ray diffractometry and a density ($D_A$) of 0.935 to 0.950

TABLE 1

|  |  | Example 1 | Example 2 | Example 3 | Comparative Example 1 | Comparative Example 2 |
|---|---|---|---|---|---|---|
| Randam Copolymer (A) | | | | | | |
| MFR | (g/10 min) | 0.04 | 0.04 | 0.03 | 0.04 | 0.03 |
| D | (g/cm$^3$) | 0.945 | 0.945 | 0.949 | 0.953 | 0.949 |
| Randam Copolymer (B) | | | | | | |
| MFR | (g/10 min) | 2.0 | 2.1 | 2.0 | | ethylene/pro- |
| D | (g/cm$^3$) | 0.920 | 0.930 | 0.920 | | pylene copolymer rubber |
| (A)/(B) Blend Weight Ratio | | 90/10 | 90/10 | 80/20 | — | 90/10 |
| Physical Properties of Film | | | | | | |
| Tear Strength | MD | 8 | 8 | 7 | 5 | 5 |
| (kg/cm) | TD | 94 | 87 | 89 | 55 | 64 |
| Impact Strength (kg · cm/cm) | | 8700 | 8500 | 8400 | 7100 | 6500 |
| Tensile characteristics, MD/TD | | | | | | |
| stress at yield (kg/cm$^2$) | | —/254 | —/265 | —/249 | —/285 | —/271 |
| strength at break (kg/cm$^2$) | | 780/640 | 770/637 | 791/610 | 890/775 | 550/340 |
| elongation at break (%) | | 175/540 | 182/535 | 169/550 | 210/380 | 100/251 |
| Young's modulus × 10$^3$ (kg/cm$^2$) | | 8.1/8.5 | 8.5/9.0 | 8.3/8.6 | 13.5/11.0 | 9.8/11.2 |
| Weatherability | | | | | | |
| Residual ratio (%) of tensile strength in MD direction after 30 days | | 95 | 97 | 93 | 77 | 65 |
| Elongation residual ratio (%) after 60 days | | 55 | 65 | 60 | 55 | 20 |

EXAMPLE 4

A film having a thickness of 10 μm was prepared in the same manner as described in Example 1 except that the random copolymer resin (A) and (B) disclosed in Table 2 were used.

The physical properties of the obtained film are shown in Table 2.

g/cc as determined at 20° C. and (B) a resin of a random copolymer of ethylene with an α-olefin having at least 4 carbon atoms, which has a melt flow rate of 0.1 to 5 g/10 min (as determined at 190° C.), a crystallinity of at least 40% by the X-ray diffractometry and a melting point of 115 to 130° C., at an (A)/(B) weight ratio of from 92/8 to 70/30, wherein the density ($D_B$) (g/cc) of the random copolymer resin as the component (B), determined at 20° C., satisfied the following requirements:

$$0.905 \leq D_B \leq 0.935; \text{ and}$$

$$D_B \leq 0.9 D_A + 0.09$$

wherein $D_A$ stands for the density of the random copolymer resin as the component (A), determined at 20° C.

2. A film as set forth in claim 1, wherein the random copolymer resin (A) has an ethylene content of 95 mole%.

3. A film as set forth in claim 1, wherein the thickness of the film is 7 to 15 μm.

4. A film as set forth in claim 1, wherein the random copolymer resin (B) is linear low-density polyethylene.

* * * * *

UNITED STATES PATENT AND TRADEMARK OFFICE
CERTIFICATE OF CORRECTION

PATENT NO. : 4,828,906

DATED : May 9, 1989

INVENTOR(S) : TOSHIHIRO NISHIMURA ET AL.

It is certified that error appears in the above-identified patent and that said Letters Patent is hereby corrected as shown below:

Column 6, Claim 1, line 32, after "min", --(as determined at-- should be inserted;

Column 7, Claim 1, line 1, "satisfied" should read --satisfies--.

Signed and Sealed this

Fifth Day of December, 1989

Attest:

JEFFREY M. SAMUELS

Attesting Officer    Acting Commissioner of Patents and Trademarks